L. HOLZWARTH, H. FROELSCH, & T. GERHARDS.
Improvement in Meat Mincers.
No. 123,899.    Patented Feb. 20, 1872.
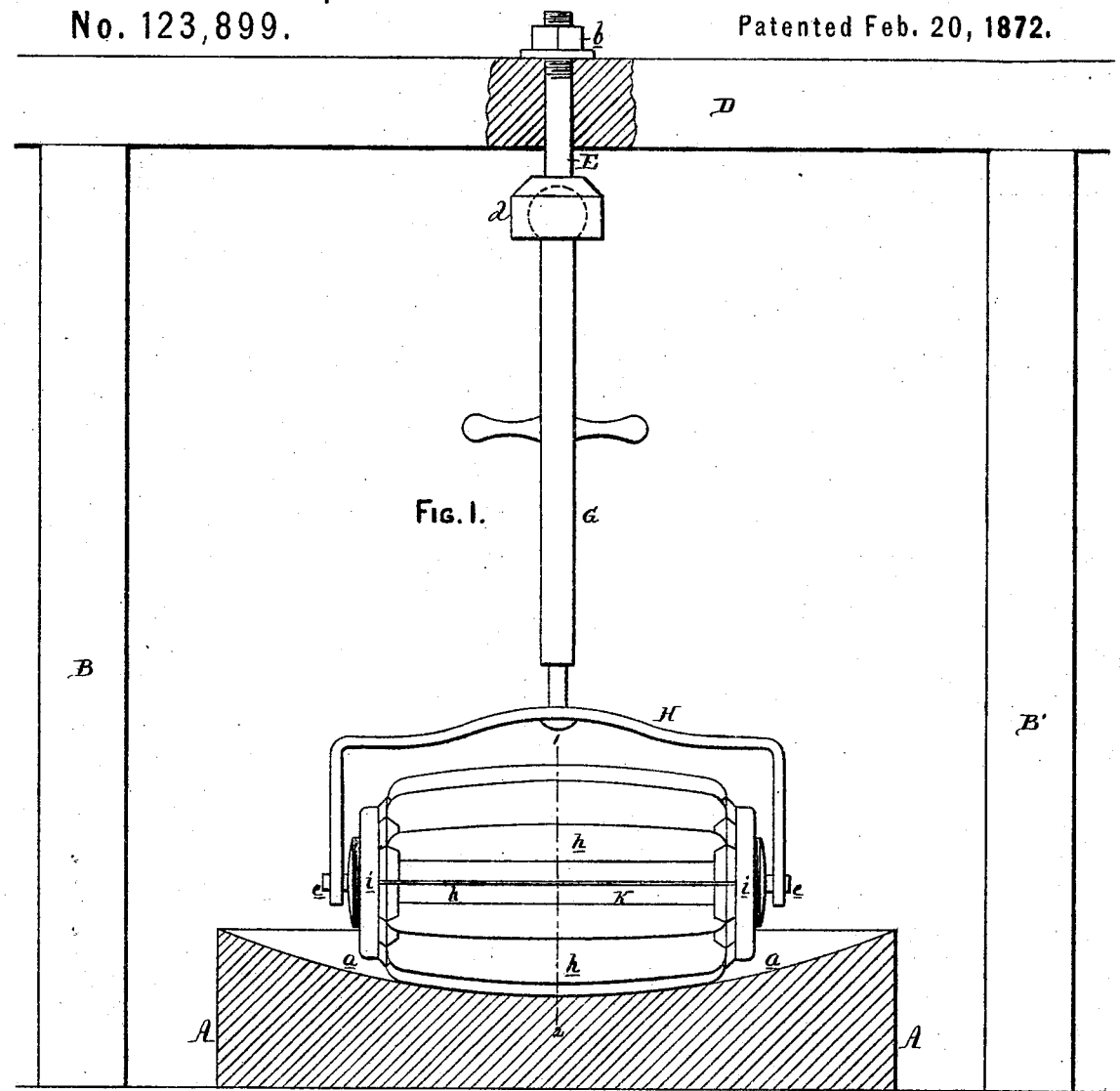
Fig. 1.
Fig. 3.
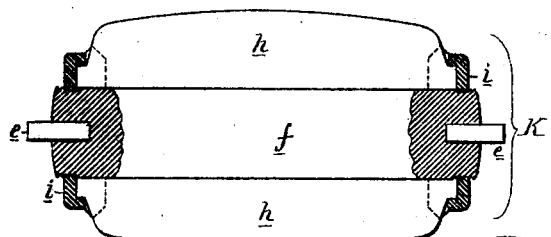
Fig. 2.
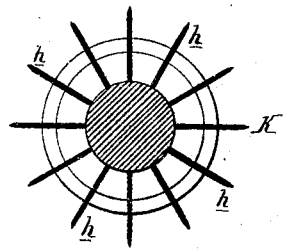
Fig. 4.
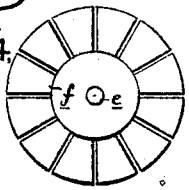
Witnesses:
Louis Holzwarth
H. Froelsch and
T. Gerhards.
by their Attys
Howson and Son 123,899

UNITED STATES PATENT OFFICE.

LOUIS HOLZWARTH, HENRY FROELSCH, AND THEODORE GERHARDS, OF PHILADELPHIA, PENNSYLVANIA.

IMPROVEMENT IN MEAT-MINCERS.

Specification forming part of Letters Patent No. 123,899, dated February 20, 1872.

Specification describing an Improved Meat-Mincer, invented by LOUIS HOLZWARTH, HENRY FROELSCH, and THEODORE GERHARDS, all of Philadelphia, county of Philadelphia and State of Pennsylvania.

Our invention consists of apparatus, too fully explained hereafter to need preliminary description, for rapidly and effectually mincing meat, &c.

In the accompanying drawing, Figure 1 is a front view of our improved meat-mincer; Fig. 2, a transverse section on the line 1 2, Fig. 1; Fig. 3, a longitudinal section of Fig. 2; and Fig. 4, a view of a part of the rotary mincer.

A is a block, of wood or other appropriate material, having in the top a concave recess, a, the block being secured to the base of any suitable frame, consisting, in the present instance, of posts B and B', connected together at the top by a cross-bar, D. To this cross-bar is suspended a pin, E, by a nut, b, in such a manner that by turning the nut the pin can be raised and lowered at pleasure. To an enlargement, d, at the lower end of the pin, is attached, by a ball-and-socket joint, a rod, G, to which a yoke, H, is connected in such a manner that it can have restricted vertical movement independently of the rod. In this yoke turn the journals e e of the rotating cutter or mincer K, the peculiar construction of which will be best observed in Figs. 2, 3, and 4, and which consists of a solid cylinder, f, of metal, a series of blades, h, radiating from the cylinder, and two disks, i i, for confining the blades, on the opposite ends of which are projections overlapped by flanges on the disks, so that when the latter are secured onto the ends of the cylinder they retain the blades, in the manner clearly shown in Fig. 3, the blades being maintained at the proper distance apart by filling-pieces best observed in Fig. 4. The cutting-edges of the blades, viewing the mincer transversely, as in Fig. 2, are in a circle, of which the journals e e are the centers; and viewed longitudinally, as in Fig. 3, the edges of the blades are rounded to coincide, or nearly so, with the concavity of the block A.

The meat to be minced is placed in the recess of the said block, and the operator, grasping the rod G or any suitable handle attached to the same, vibrates it backward and forward, thereby causing the mincer to roll over the meat in directions suggested by the condition of the same, the meat being thus rapidly severed and minced by the action of the blades, the mincer itself being permitted to rise and fall on the rod G, and accommodate itself to the mass of meat on the block, and its weight being sufficient to cause the knives to act with the desired effect on the meat. When the meat has been sufficiently minced, it may be removed from the concavity of the block, after elevating the rod G and with it the mincer, by turning the nut b.

We claim as our invention—

1. The rotary mincer, consisting of a cylinder, f, radial blades h, and disks i, adapted to each other substantially as described.

2. The combination of the said rotary mincer and its rounded blades with the block and its concave recess a.

3. The mincer, arranged to turn in a yoke, H, or its equivalent, in combination with a rod, G, connected to the said yoke, and suspended by a ball-and-socket joint to the pin E, or other equivalent adjustable object.

In testimony whereof we have signed our names to this specification in the presence of two subscribing witnesses.

LOUIS HOLZWARTH.
HENRY FROELSCH.
THEODORE GERHARDS.

Witnesses:
WM. A. STEEL,
JOHN K. RUPERTUS.